United States Patent Office 2,837,354
Patented June 3, 1958

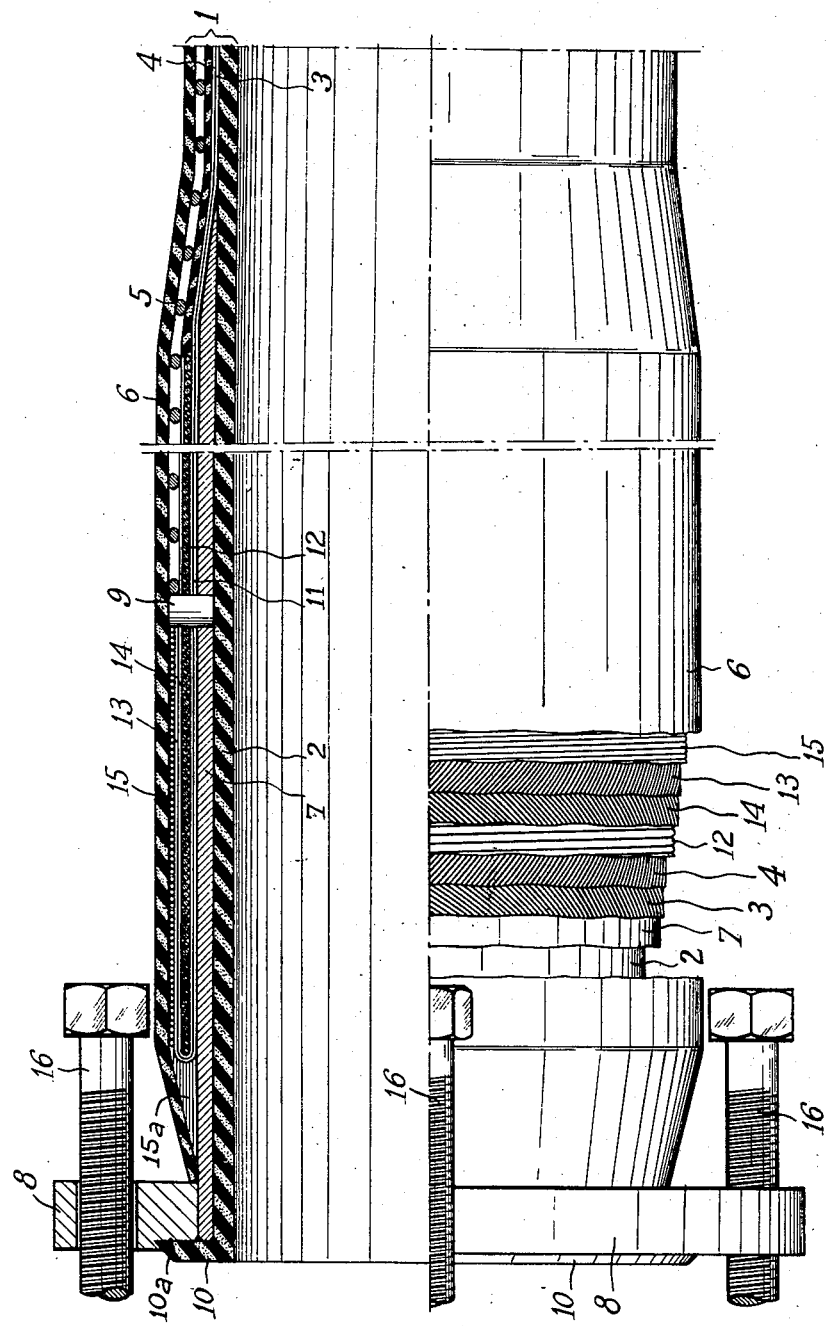

2,837,354

FLANGE COUPLING FOR REINFORCED PLURAL LAYER RESILIENT TUBES

Bernard Thibault and Jacques Richardin, Decize, France, assignors to Pneumatics & Caoutchouc Manufacture Kleber Colombes, Societe Anonyme, Colombes, France Application June 28, 1955, Serial No. 518,634

Claims priority, application France June 28, 1954

4 Claims. (Cl. 285—149)

The present invention relates to devices for connecting flexible tubes formed from rubber and rubber-like materials, which are suitable either for connecting two tubes with each other or for connecting a tube with accessories and fittings which are generally flanged.

There are a great number of couplings known which are adapted to be connected to the ends of a tube after the vulcanization of the latter. When it is desired to obtain a strong connection between the end of a tube and a coupling, generally a flange coupling, with which it is to be provided, the tube is made up on the coupling itself, and the whole assembly is then vulcanized under the action of heat and pressure. This method is most often employed in the case of tubes which are to be used for high pressure fluid transmission or in the case of tubes of large diameter which are to be employed for medium pressure fluids. In the former case it has been proposed to employ a special coupling formed from a piece of cast steel which has been given the desired shape by machining.

These couplings, which are to be employed for service pressures of the order of 200 kg./cm.$^2$ are suitable for tubes which have a wall formed from a rubbery material which has been well reinforced. The reinforcement takes the form of two superposed sheaths or reinforcing layers defined by hard-steel cables, these cables being wound in helices coaxial with the tube, and the cables of one of the sheaths forming with the axis of the tube an angle which is opposite to that of the cables of the other sheath.

The first or inner sheath is doubled back over a locking collar held by bolts on the body of the coupling, while the second or outer sheath is disposed on top of the first sheath and is doubled back like the first sheath, but independently thereof, around a second locking collar analogous to the first-mentioned one. Such a coupling is lined on its interior side by the innermost part of the tube wall. While this device makes it possible to avoid the leakages which generally occur in couplings of the conventional type along the contact surface of the coupling and the end of the tube wall, it suffers on the other hand from severe drawbacks. In the first place, it is very heavy, which prevents its use in those installations in which it must be manipulated without the help of special apparatus, particularly when it is of large diameter, e. g. of the order of 200 mm., and, secondly, it is very expensive to manufacture because of the great amount of machining which must be carried out on a piece of steel coming from the foundry in order to obtain the desired special shape.

Another drawback of these known constructions lies in the fact that the hard-steel cables of the reinforcing armouring of the tube, which are disposed side-by-side according to a given angle with respect to the axis of the forming mandrel, form, when wound upon the outer surface of the special profile of the coupling, angles with the axis which vary as a function of their distance from the axis, a fact which makes their application difficult, particularly when these cables are no longer contiguous. This may lead to irregular distribution of the cables around the axis of the coupling, resulting in unequal working stresses in the cables.

This unequal force distribution is aggravated by the fact that each sheath of cables is attached separately to the coupling so that there is little likelihood of making the tensions in all of the cables uniform. This is evident in practice by the fact that in tests of the action of internal fluid pressure against a plate closing the end of the coupling, the latter sometimes does not remain coaxial with respect to the adjacent end of the tube but places itself slightly askew, thus creating detrimental excess stress in some of the cables of the armouring.

It is an object of the present invention to provide an improved tube-coupling construction of the type above-described which has a construction which is more convenient and economical while, at the same time, ensuring a good connection between the flange coupling and the end of the flexible tube, particularly for medium operating pressures and interior diameters which may exceed 200 mm.

Another object of the invention is to provide a device of this nature which is a solid of revolution about the common axis of the coupling and tube, thus making it possible to obtain uniform distribution of the forces in all of the cables of the armouring.

A still further object is to provide an economical coupling device which can be utilized with a tube having an armouring which consists essentially of metal threads or of cord metal fabric.

The coupling construction according to the present invention is characterized by the fact that an annular inner portion of the tube wall is in contact with and completely covers the inner surface of the coupling member, while the other portion is comprised mainly of sheaths of reinforcing wire and is in contact with the outer surface, of substantially uniform diameter, of the coupling member along the greater part of its length. In this construction, the sheaths are pressed against the outer surface of the coupling member by a first ferrule and are turned over the outer edge of the ferrule, thus covering the same, the turned-over part being pressed against the outer surface of the first ferrule, on a more or less extended part of its length, by a second ferrule, means being provided for preventing longitudinal displacement of the ferrules.

The first ferrule and the second ferrule may each be defined by contiguous turns disposed perpendicularly to the axis of the coupling.

The outer surface of the coupling may be provided with nipples distributed circumferentially along a circumferential line situated substantially at the center of the axial dimension of the coupling.

The inner annular portion of the tube wall may be turned over at its end on to the outer surface of the coupling flange.

The reinforcing sheaths of the tube wall may consist of fabric without, or substantially without, weft, of stretch-resisting material, there being provided for each sheath a further sheath the cables of which form with the axis of the tube an angle opposite to that of the cables in the first sheath.

The reinforcing sheaths may be defined by two sheaths of metal wires wound in helices coaxial with the tube, the wires of one sheath forming with the axis of the tube an angle which is opposite to that of the wires of the other sheath.

The reinforcing sheaths may be formed from woven textile fabric.

The invention will now be described in detail with particular reference to the accompanying drawing, which is a side elevational view, partly in section, partly in elevation, and with some parts broken away, of a coupling connection embodying features of the invention.

The annular wall 1 of the rubber-base flexible tube comprises a rubbery inner part or lining 2, a reinforcing armouring which consists of two sheaths 3 and 4 of metal fabric, and a metal cable 5 wrapped around in helical turn. The external portion of the wall is provided by a coating 6 of rubber-like material. A tubular metal coupling member 7, to which is secured, as by soldering or brazing, a flange 8 provided with axial holes for the passage of bolts 16, is advantageously formed from a tube. Coupling 7 is of substantially uniform thickness except towards its inner end which is not provided with a flange, at which it is suitably provided with a slight chamfer. Approximately at the center of the axial dimension of coupling member 7 there are provided a plurality of radially-extending, circumferentially spaced-apart cylindrical nipples 9 which are soldered in the wall of coupling member 7.

According to the invention the lining 2 is disposed on the interior of the coupling member 7 and is in contact with the inner surface thereof throughout its length. At the end which is provided with the flange 8, the lining 2 is directed radially outwardly so that it will be against the outer face of the flange 8. A small annular recess or seat 10a is provided for this purpose in the flange face, the recess being of such depth that the lining lying in it projects outwardly from the outer face of the flange. The sheaths 3 and 4 are formed with weft-less metal fabric, the cables 11 of which are disposed helically, thus forming a constant angle with the axis of the tube, the cables of the sheath 3 forming with the axis an angle opposite to that formed by those of the sheath 4. These two sheaths envelop the coupling member 7 with which they are in close contact. The cables 11 of these two sheaths are wound in helices on the outer surface of the coupling member 7 substantially throughout its length. Due to the fact that the diameter of this outer surface is substantially constant, the application of the cables forming the sheaths 3 and 4 is very easy. On the other hand, since the diameter of each of the sheaths 3 and 4, when wrapped round the coupling member 7, is only slightly greater than its diameter in the wall 1 of the tube, the relative disposition of the cables of each sheath does not have to undergo any great variation at the moment at which the sheath comes into contact with the outer surface of the coupling 7. As a result, the cables 11 which are contiguous in the wall 1 are still practically so around the coupling member 7. This makes regular placing of the same very easy resulting in uniform distribution, and ensuring uniform distribution of stress. When the nipples 9 are encountered, the cables 11 separate slightly in order to pass along both sides of the nipples, with the two sheaths 3 and 4 continuing until close to the flange 8, as shown in the drawing. A ferrule 12, consisting of steel wire wound in contiguous turns extending substantially perpendicularly to the axis of the coupling, presses the two sheaths 3 and 4 simultaneous from the flange-less inner chamfered end of the coupling member 7 up to a point adjacent the flange 8, as shown in the drawing. The sheaths 3 and 4 are then folded back on the outer side of ferrule 12 and extend axially up to the line of the nipples 9 as portions defining secondary sheaths 13 and 14, respectively.

The armouring 5 of the tube wall 1 is disposed around ferrule 12 to the line of the nipples 9 and is substantially flush with the radially-outward end faces of these nipples. On top of the secondary portions 13 and 14 of the sheaths 3 and 4, which portions are folded back on top of the ferrule 12, as above-described there is disposed a second ferrule 15, which is similar in construction to ferrule 12, and extends throughout the length of the sheath portions 13 and 14 up to the line of the nipples. The outer surface of ferrule 15, the end surfaces of the nipples 9, and the outer contour of the armouring 5 thus define one substantially continuous cylindrical surface. The coating 6 of the tube wall 1 covers this continuous surface and constitutes an outer cylindrical surface without any need of using fabric stuffing as in the hitherto employed devices except at the end nearest the flange 8, as shown in 15a of the annexed drawing. This arrangement, which is of convenient construction, and in which the various elements are arranged in coaxial cylinders without any stuffing, leads to minimum thickness and thus permits ready removal of the bolts 16 even though the sheaths 3 and 4 and the ferrules 12 and 15 extend to a point very close to the flange 8, as can be seen in the drawing. As a result, for a given length of coupling member 7, the part utilized for the connection with the tube wall 1 is substantially greater than in hitherto known couplings. In the latter, in fact, the non-cylindrical disposition of the various sheaths due to the presence in the coupling of a stop ring, generally of semi-circular shape, soldered to the coupling, causes extra thickness at these rings which in most cases makes removal of the bolts 16 difficult unless the entire portion of the device disposed exteriorly of the coupling terminates at a relatively great distance from the flange 8. As a result, the resistance against separation of coupling and tube is greatly improved in the device according to the invention.

The invention obviously is not limited to the details of construction of the embodiment described and illustrated in the drawing. For example, one may utilize as reinforcing material either woven textile fabric, or cord textile fabric, arranged in an even number of sheaths, without departing from the scope of the invention.

It will be obvious that various other changes and modifications may be made within the scope of the invention, as defined in the appended claims, and it is intended, therefore, that all matter contained in the foregoing description and in the drawings shall be interpreted as illustrative only and not as limitative of the invention.

What we claim and desire to secure by Letters Patent is:

1. A tube coupling construction for a tube having a wall including an inner annular portion of resilient flexible material which is reinforced by an annular covering comprising a plurality of reinforcing layers of stretch-resisting material, said construction comprising a flanged coupling member having an exterior surface of substantially uniform diameter, the inner annular portion of the tube wall being disposed interiorly of and in contact with the inner surface of said coupling member to cover said inner surface completely, and the outer surface of substantially uniform diameter of the coupling member being overlain by the layers of reinforcing material along the major portion of its length, said layers overlying each other in parallel cylindrical planes concentric with the axis of the coupling, a first ferrule lying wholly in a plane parallel to said planes and simultaneously pressing the several overlying layers of reinforcing material against said outer surface of the coupling member and said layers being bent back around the outer edge of said ferrule to cover it, a second ferrule lying wholly in a plane parallel to said first-named planes and simultaneously pressing inwardly the portion of the overlying reinforcing layers bent back against the outer surface of said first ferrule, and discontinuous locking means for preventing longitudinal displacement of said ferrules.

2. A tube coupling construction for a tube having a wall including an inner annular portion of resilient flexible material which is reinforced by an annular covering comprising a plurality of reinforcing layers of stretch-resisting material, said construction comprising a flanged coupling member having an exterior surface of substantially uniform diameter, the inner annular portion of the tube wall being disposed interiorly of and in contact with the inner surface of said coupling member to cover said inner surface completely, and the outer surface of substantially uniform diameter of the coupling member being overlain by the layers of reinforcing material along the major portion of its length, said layers overlying each other in parallel cylindrical planes concentric with the axis of the coupling, each of said reinforcing layers consisting of weftless fabric defined by metal wire wound in a helix coaxial with the tube, the wire of one layer forming with the axis of the coupling member an angle opposite to that formed by the wire of the other layers, a first ferrule lying wholly in a plane parallel to said planes and simultaneously pressing the several overlying layers of reinforcing material against said outer surface of the coupling member and said layers being bent back around the outer edge of said ferrule to cover it, a second ferrule lying wholly in a plane parallel to said first-named planes and simultaneously pressing inwardly the portion of the overlying reinforcing layers bent back against the outer surface of said first ferrule, and discontinuous locking means having substantially radially-extending walls for preventing longitudinal displacement of said ferrules.

3. A tube coupling construction for a tube having a wall including an inner annular portion of resilient flexible material which is reinforced by an annular covering comprising a plurality of reinforcing layers of stretch-resisting material, said construction comprising a flanged coupling member having an exterior surface of substantially uniform diameter, the inner annular portion of the tube wall being disposed interiorly of and in contact with the inner surface of said coupling member to cover said inner surface completely, and the outer surface of substantially uniform diameter of the coupling member being overlain by the layers of reinforcing material along the major portion of its length, said layers overlying each other in parallel cylindrical planes concentric with the axis of the coupling, a first ferrule lying wholly in a plane parallel to said planes and simultaneously pressing the several overlying layers of reinforcing material against said outer surface of the coupling member and said layers being bent back around the outer edge of said ferrule to cover it, a second ferrule lying wholly in a plane parallel to said first-named planes and simultaneously pressing inwardly the portion of the overlying reinforcing layers bent back against the outer surface of said first ferrule, and discontinuous locking means for preventing longitudinal displacement of said ferrules, comprising a plurality of radially-extending, circumferentially spaced-apart nipples secured to said coupling member and having substantially radially-extending walls.

4. A tube coupling construction for a tube having a wall including an inner annular portion of resilient flexible material which is reinforced by an annular covering comprising a plurality of reinforcing layers of stretch-resisting material, said construction comprising a flanged coupling member having an exterior surface of substantially uniform diameter, the inner annular portion of the tube wall being disposed interiorly of and in contact with the inner surface of said coupling member to cover said inner surface completely, and the outer surface of substantially uniform diameter of the coupling member being overlain by the layers of reinforcing material along the major portion of its length, said layers overlying each other in parallel cylindrical planes concentric with the axis of the coupling, each of said reinforcing layers consisting of weftless fabric defined by metal wire wound in a helix coaxial with the tube, the wire of one layer forming with the axis of the coupling member an angle opposite to that formed by the wire of the other layers, a first ferrule lying wholly in a plane parallel to said planes and simultaneously pressing the several overlying layers of reinforcing material against said outer surface of the coupling member and said layers being bent back around the outer edge of said ferrule to cover it, a second ferrule lying wholly in a plane parallel to said first-named planes and simultaneously pressing inwardly the portion of the overlying reinforcing layers bent back against the outer surface of said first ferrule, said ferrules each being formed from metal wire wound in contiguous turns disposed substantially perpendicularly to the coupling member axis, and discontinuous locking means for preventing longitudinal displacement of said ferrules, comprising a plurality of radially-extending, circumferentially spaced-apart nipples secured to said coupling member and having substantially radially-extending walls.

References Cited in the file of this patent

UNITED STATES PATENTS

| | | |
|---|---|---|
| 1,118,451 | Sloper | Nov. 24, 1914 |
| 1,847,218 | Lamb | Mar. 1, 1932 |
| 2,146,218 | Kimmich et al. | Feb. 7, 1939 |
| 2,219,047 | Maclachlan | Oct. 22, 1940 |
| 2,220,785 | Goodall | Nov. 5, 1940 |
| 2,234,350 | Muller | Mar. 11, 1941 |
| 2,298,736 | Harpfer | Oct. 13, 1942 |